US011165573B2

(12) United States Patent
Gasparini

(10) Patent No.: US 11,165,573 B2
(45) Date of Patent: Nov. 2, 2021

(54) DIGITAL IDENTITY ESCROW METHODS AND SYSTEMS

(71) Applicant: Covault Inc., San Francisco, CA (US)

(72) Inventor: Louis Gasparini, San Mateo, CA (US)

(73) Assignee: Banco Bilbao Vizcaya Argentaria, S.A., Madrid (ES)

( * ) Notice: Subject to any disclaimer, the term of this patent is extended or adjusted under 35 U.S.C. 154(b) by 294 days.

(21) Appl. No.: 16/290,848

(22) Filed: Mar. 1, 2019

(65) Prior Publication Data

US 2020/0021438 A1 Jan. 16, 2020

Related U.S. Application Data

(60) Provisional application No. 62/696,800, filed on Jul. 11, 2018.

(51) Int. Cl.
*H04L 9/08* (2006.01)
*H04L 9/30* (2006.01)
*H04L 29/06* (2006.01)
*H04L 9/32* (2006.01)
*G06F 16/907* (2019.01)

(52) U.S. Cl.
CPC .......... *H04L 9/0894* (2013.01); *G06F 16/907* (2019.01); *H04L 9/085* (2013.01); *H04L 9/30* (2013.01); *H04L 9/321* (2013.01); *H04L 9/3247* (2013.01); *H04L 63/10* (2013.01)

(58) Field of Classification Search
CPC ......... H04L 9/0894; H04L 9/30; H04L 9/085; H04L 63/10; H04L 9/3247; H04L 9/321; H04L 63/0407; H04L 63/045; H04L 9/0825; G06F 16/907; G06F 21/6245
See application file for complete search history.

(56) References Cited

U.S. PATENT DOCUMENTS

2006/0129817 A1* 6/2006 Borneman .......... H04L 63/0815
713/170
2007/0101145 A1* 5/2007 Sachdeva .............. H04L 9/3271
713/176

(Continued)

OTHER PUBLICATIONS

International Search Report and Written Opinion received in International Application No. PCT/US19/20775.

*Primary Examiner* — Matthew Smithers
(74) *Attorney, Agent, or Firm* — ALG Intellectual Property, LLC

(57) ABSTRACT

An exemplary method includes maintaining encrypted identity data associated with a user, the encrypted identity data representative of a digital identity of the user, receiving an access request from a service provider system for the service provider system to have access to the digital identity of the user when the user attempts to access a service provided by the service provider system, transmitting, in response to the access request, an authorization request to a computing device associated with the user, the authorization request prompting the user to authorize sharing of the digital identity with the service provider system, receiving, from the computing device, authorization data indicating that the user authorizes sharing of the digital identity with the service provider system, and providing, in response to receiving the authorization data from the computing device, the service provider system with access to the digital identity.

20 Claims, 12 Drawing Sheets

(56) References Cited

U.S. PATENT DOCUMENTS

| | | | |
|---|---|---|---|
| 2010/0043065 A1* | 2/2010 | Bray | H04L 63/0815 726/8 |
| 2013/0208893 A1* | 8/2013 | Shablygin | H04L 9/3213 380/277 |
| 2014/0093084 A1* | 4/2014 | De Atley | G06F 21/64 380/277 |
| 2014/0108172 A1 | 4/2014 | Weber | |
| 2016/0134599 A1* | 5/2016 | Ross | H04L 63/08 713/168 |
| 2019/0097812 A1* | 3/2019 | Toth | H04L 9/3213 |
| 2019/0140844 A1* | 5/2019 | Brown | H04L 9/321 |

* cited by examiner

DIGITAL IDENTITY ESCROW METHODS AND SYSTEMS

RELATED APPLICATIONS

The present application claims priority under 35 U.S.C. § 119(e) to U.S. Provisional Patent Application No. 62/696,800, filed on Jul. 11, 2018, which application is incorporated herein by reference in its entirety.

BACKGROUND INFORMATION

To register for a service (e.g., an online service, a hotel stay, renting a bicycle from a kiosk, etc.), a user may be required to provide various forms of personally identifiable information. For example, a user may be required to provide credit card information, bank account information, a copy of a passport, driver's license, or birth certificate, and/or a social security number during a registration process in which the user attempts to access a service provided by a service provider. In addition to being cumbersome, time consuming, and expensive to implement, such registration processes subject both the user and the service provider to risk. For example, each time a user shares sensitive personally identifiable information, he or she becomes even more susceptible to identity theft. Moreover, a service provider that collects personally identifiable information may be the target of a data breach.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
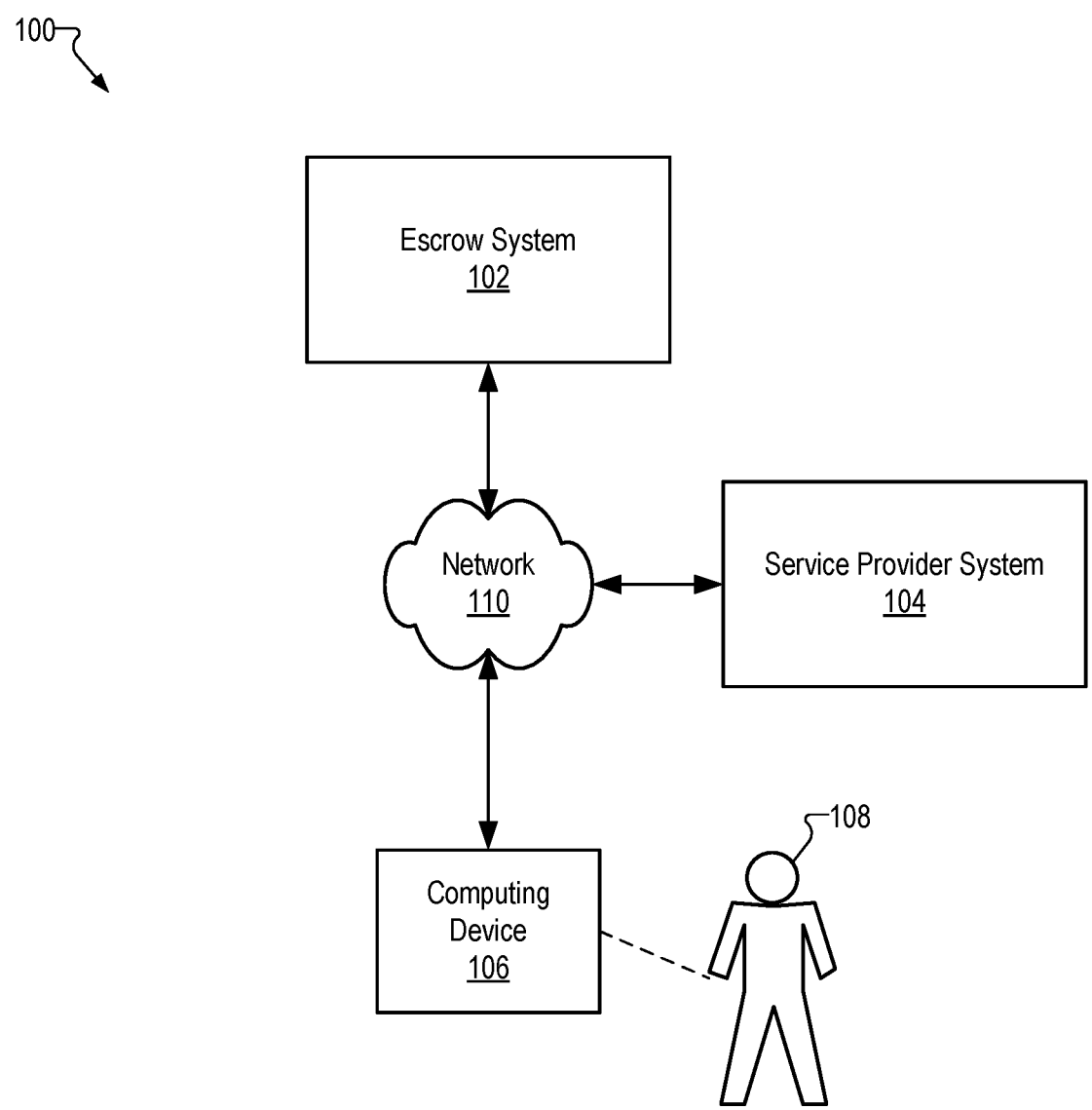
FIG. 1 shows an exemplary configuration in which a user accesses a service provided by a service provider according to principles described herein.

Digital identity escrow management methods and systems are described herein. The methods and systems described herein may obviate the need for a user to directly provide a service provider with personally identifiable information to access a service provided by the service provider. This may minimize risk of identity theft for the user, minimize liability for the service provider, and/or otherwise improve security compared to conventional service registration processes. Moreover, the methods and systems described herein may reduce an amount of time and effort required for a user to register for a service and minimize the burden of managing sensitive user information by a service provider, thereby improving an operation of computing devices utilized by the service provider and/or user and resulting in an improved user experience compared to conventional service registration processes.

In one example, an exemplary escrow system may 1) maintain encrypted identity data associated with a user, the encrypted identity data representative of a digital identity of the user, 2) receive an access request from a service provider system for the service provider system to have access to the digital identity of the user when the user attempts to access a service provided by the service provider system, 3) transmit, in response to the access request, an authorization request to a computing device associated with the user, the authorization request prompting the user to authorize sharing of the digital identity with the service provider system, 4) receive, from the computing device associated with the user, authorization data indicating that the user authorizes sharing of the digital identity with the service provider system, and 5) provide, in response to receiving the authorization data from the computing device associated with the user, the service provider system with access to the digital identity. The service provider system may then provide the user with the service, as will be described herein.

In another example, an exemplary service provider system may 1) receive a service request from a user, the service request requesting access by the user to a service provided by the service provider system, 2) transmit, in response to the service request, an access request to an escrow system that maintains encrypted identity data representative of a digital identity of the user, the access request requesting access by the service provider system to the digital identity of the user, and 3) receive, based on the access request, data that facilitates access to the digital identity of the user. The service provider system may then provide the user with the service, as will be described herein.

In another example, an application executed by a computing device associated with a user may 1) transmit a service request to a service provider system, the service request requesting access by the user to a service provided by the service provider system, 2) receive, based on the service request, an authorization request from an escrow system separate from the service provider system and that maintains encrypted identity data representative of a digital identity of the user, the authorization request prompting the user to authorize sharing of the digital identity of the user with the service provider system, 3) transmit, in response to input provided by the user, authorization data to the escrow system, the authorization data indicating that the user authorizes sharing of the digital identity with the service provider system, and 4) receive, based on the authorization data, access to the service.

An illustration of the examples provided above will now be described. A user may participate in a one-time registration process in which the user signs up for a digital identity escrow service provided by an escrow system. During this registration process, the user may provide one or more forms of personally identifiable information to the escrow system. For example, the user may provide the escrow system with the user's credit card information, the user's bank account information, the user's passport, the user's driver's license, the user's social security number, the user's birth certificate, and/or any other personally identifiable information as may serve a particular implementation. The personally identifiable information may be provided in any suitable manner (e.g., by providing physical items associated with the personally identifiable information and/or digitally uploading the information by way of a network).

Based on the personally identifiable information provided by the user, the escrow system may generate a digital identity for the user. The digital identity may include one or more attributes each representative of one of the forms of personally identifiable information provided by the user. The escrow system may encrypt the digital identity (e.g., with a public key corresponding to the user) and store the encrypted identity data in memory included in or accessed by the escrow system.

The user may subsequently attempt to access a service provided by a service provider other than the escrow system. In this particular example, the user attempts to rent a bicycle from a stand-alone kiosk. Other examples of services that the user may attempt to access are described herein.

To rent a bicycle from the kiosk, the user may provide a service provider system (e.g., a computing device) associated with the kiosk with a service request to rent a bicycle. For example, the user may input an identity handle (e.g., a phone number, an email, or other unique identifier associated with the user) into a computing device located at the kiosk and/or into an application (e.g., an application associated with a company that provides the bicycle rental service) executed by the user's mobile device.

In response to receiving the service request, the service provider system may transmit an access request to the escrow system that maintains the encrypted identity data representative of the digital identity of the user. The access request is configured to request access by the service provider system to the digital identity of the user.

In response to receiving the access request, the escrow system may transmit an authorization request to a computing device associated with the user. For example, the escrow system may transmit a push notification to a mobile device associated with the user. The push notification may prompt the user to authorize sharing of the digital identity with the service provider system. The user may interact with the push notification and/or computing device in any suitable manner to provide authorization for the escrow system to share the user's digital identity with the service provider system.

In response to receiving authorization data from the computing device associated with the user indicating that the user authorizes sharing of the digital identity with the service provider system, the escrow system may provide the service provider system with access to the digital identity. This may be performed in any of the ways described herein. The service provider system may then allow the user to rent a bicycle from the kiosk. Advantageously, this entire process may be performed without the user having to directly provide the service provider system with any of the personally identifiable information represented by the digital identity of the user.

FIG. 1 shows an exemplary configuration 100 in which a user accesses a service provided by a service provider. As shown, configuration 100 includes an escrow system 102, a service provider system 104, and a computing device 106 associated with a user 108. Escrow system 102, service provider system 104, and computing device 106 may be selectively and communicatively coupled one to another by way of a network 110.

Escrow system 102 may be implemented by one or more cloud-based computing devices configured to communicate with other computing devices and/or systems by way of network 110. For example, escrow system 102 may be implemented by one or more servers, digital data storage systems, key management systems, and/or other physical computing devices as may serve a particular implementation.

Escrow system 102 may be maintained and/or otherwise managed by a digital identity escrow service provider. The digital identity escrow service provider may include a banking institution, a government entity, and/or any other suitable entity as may serve a particular implementation.

Service provider system 104 may be implemented by one or more computing devices configured to facilitate providing of a service to users (e.g., user 108). For example, service provider system 104 may be implemented by a computing device located on-site at a location where the services being provided, one or more servers located remotely from where the service is being provided, and/or any other suitable computing device as may serve a particular implementation. References herein to service provider system 104 "providing" a particular service encompass scenarios in which service provider system 104 actually provides the service and/or in which a service provider (e.g., an individual or a business entity) associated with service providers system 104 provides the service.

Service provider system 104 may be maintained and/or otherwise managed by a service provider. The service provider may include a business entity, a government entity, an individual, and/or any other suitable entity as may serve a particular implementation.

In accordance with the methods and systems described herein, escrow system 102 and service provider system 104 are separate systems managed by different entities. As such, data maintained by escrow system 102 may not be accessed by service provider system 104 unless specific authorization is provided (e.g., by user 108) to escrow system 102 that allows escrow system 102 to share data with service provider system 104.

Computing device 106 may be implemented by any suitable computing device that may be associated with user 108. For example, computing device 106 may be implemented by a mobile device (e.g., a mobile phone or a tablet computer), a personal computer, a smart watch, and/or any other suitable type of electronic device configured to communicate with other devices and/or systems by way of network 110. Computing device 106 may be associated with user 108 in any suitable manner. For example, user 108 may be able to login to and/or otherwise access applications executed by computing device 106.

Network 110 may include the Internet, a wide area network, a provider-specific wired or wireless network (e.g., a cable or satellite carrier network or a mobile telephone network), a content delivery network, or any other suitable network. Data may be transmitted via network 110 between escrow system 102, service provider system 104, and computing device 106 using any communication technologies, devices, media, and protocols as may serve a particular implementation.

Figure 2:
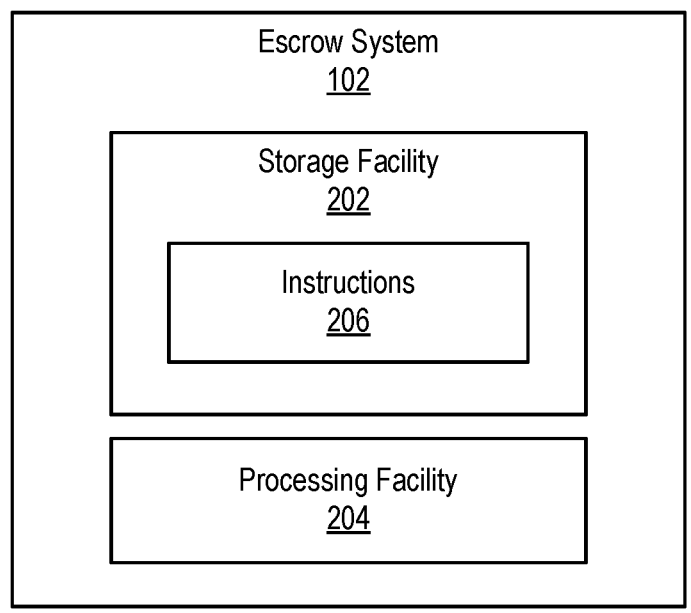
FIG. 2 illustrates exemplary components of an escrow system according to principles described herein.

FIG. 2 illustrates exemplary components of escrow system 102 that may be configured to perform various operations described herein. As shown, escrow system 102 may include, without limitation, a storage facility 202 and a processing facility 204 selectively and communicatively coupled to one another. Facilities 202 and 204 may each include or be implemented by hardware and/or software components (e.g., processors, memories, communication interfaces, instructions stored in memory for execution by the processors, etc.). In some examples, facilities 202 and 204 may be distributed between multiple devices and/or multiple locations as may serve a particular implementation.

Storage facility 202 may maintain (e.g., store) executable data used by processing facility 204 to perform various described herein. For example, storage facility 202 may store instructions 206 that may be executed by processing facility 204 to perform any of the operations described herein. Instructions 206 may be implemented by any suitable application, software, code, and/or other executable data instance. Storage facility 202 may also maintain any data received, generated, managed, used, and/or transmitted by processing facility 204.

Processing facility 204 may be configured to perform (e.g., execute instructions 206 stored in storage facility 202 to perform) various operations associated with providing a digital identity escrow service. For example, processing facility 204 may be configured to maintain (e.g., within storage facility 202) encrypted identity data associated with a user (e.g., user 108). As described herein, the encrypted identity data is representative of a digital identity of the user. Processing facility 204 may be further configured to receive an access request from a service provider system (e.g., service provider system 104) for the service provider system to have access to the digital identity of the user when the user attempts to access a service provided by the service provider system. In response to the access request, processing facility 204 may be configured to transmit an authorization request to a computing device (e.g., computing device 106) associated with the user. As described herein, the authorization request may prompt the user to authorize sharing of the digital identity with the service provider system. Processing facility 204 may be further configured to receive, from the computing device associated with the user, authorization data indicating that the user authorizes sharing of the digital identity with the service provider system. In response to receiving the authorization data from the computing device associated with the user, processing facility 204 may provide the service provider system with access to the digital identity. These and other operations that may be performed by processing facility 204 are described herein.

Figure 3:
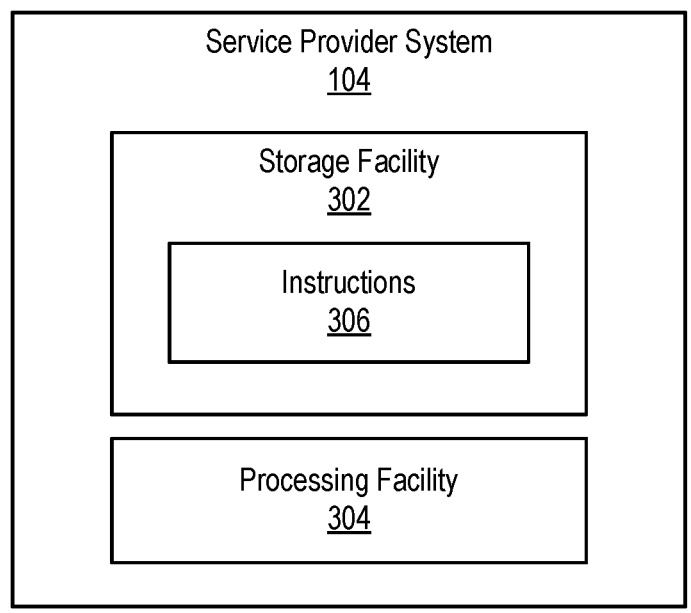
FIG. 3 illustrates exemplary components of a service provider system according to principles described herein.

FIG. 3 illustrates exemplary components of service provider system 104 that may be configured to perform various operations described herein. As shown, service provider system 104 may include, without limitation, a storage facility 302 and a processing facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform various operations described herein. For example, storage facility 302 may store instructions 306 that may be executed by processing facility 304 to perform any of the operations described herein. Instructions 306 may be implemented by any suitable application, software, code, and/or other executable data instance. Storage facility 302 may also maintain any data received, generated, managed, used, and/or transmitted by processing facility 304.

Processing facility 304 may be configured to perform (e.g., execute instructions 306 stored in storage facility 302 to perform) various operations associated with providing a service to a user (e.g., user 108). For example, processing facility 304 may be configured to receive a service request from a user. The service request may be configured to request access by the user to a service provided by service provider system 104. In response to the service request, processing facility 304 may be configured to transmit an access request to an escrow system (e.g., escrow system 102) that maintains encrypted identity data representative of a digital identity of the user. The access request is configured to request access by the service provider system to the digital identity of the user. Based on the access request, processing facility 304 may receive data that facilitates access to the digital identity of the user. These and other operations that may be performed by processing facility 304 are described herein.

Figure 4:
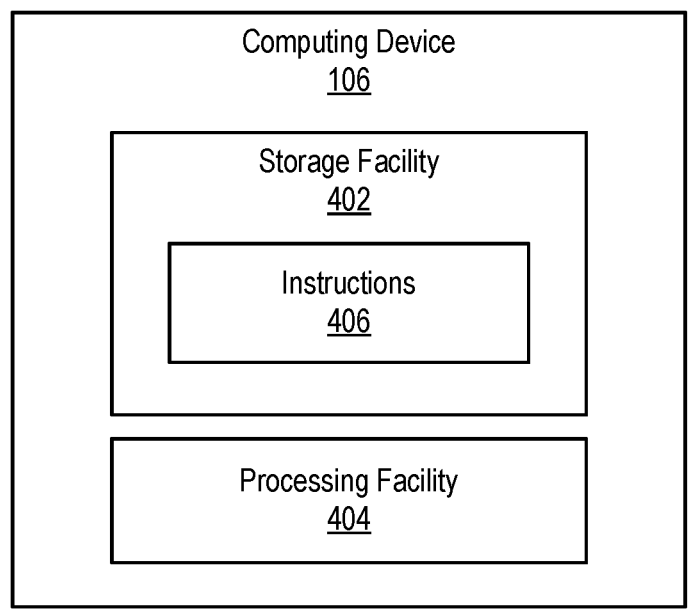
FIG. 4 illustrates exemplary components of a computing device according to principles described herein.

FIG. 4 illustrates exemplary components of computing device 106 that may be configured to perform various operations described herein. As shown, computing device 106 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform various operations described herein. For example, storage facility 402 may store instructions 406 that may be executed by processing facility 404 to perform any of the operations described herein. Instructions 406 may be implemented by any suitable application, software, code, and/or other executable data instance. For example, instructions 406 may be implemented by one or more applications (e.g., one or more mobile applications) provided by escrow system 102 and/or service provider system 104. Storage facility 402 may also maintain any data received, generated, managed, used, and/or transmitted by processing facility 404.

Processing facility 404 may be configured to perform (e.g., execute instructions 406 stored in storage facility 402 to perform) various operations associated with facilitating access by a user (e.g., user 108) to a service provided by a service provider system (e.g., service provider system 104). For example, processing facility 404 (or an application executed by processing facility 404) may transmit a service request to a service provider system. The service request is configured to request access by the user to a service provided by the service provider system. Based on the service request, processing facility 404 may be further configured to receive an authorization request from an escrow system (e.g., escrow system 102) separate from the service provider system and that maintains encrypted identity data representative of a digital identity of the user. The authorization is configured to prompt the user to authorize sharing of the digital identity of the user with the service provider system. In response to user input provided by the user and that provides authorization, processing facility 404 may be configured to transmit authorization data to the escrow system. The authorization data is configured to indicate that the user authorizes sharing of the digital identity with the service provider system. Based on the authorization data, processing facility 404 may be configured to receive access to the service. These and other operations that may be performed by processing facility 404 are described herein.

Figure 5:
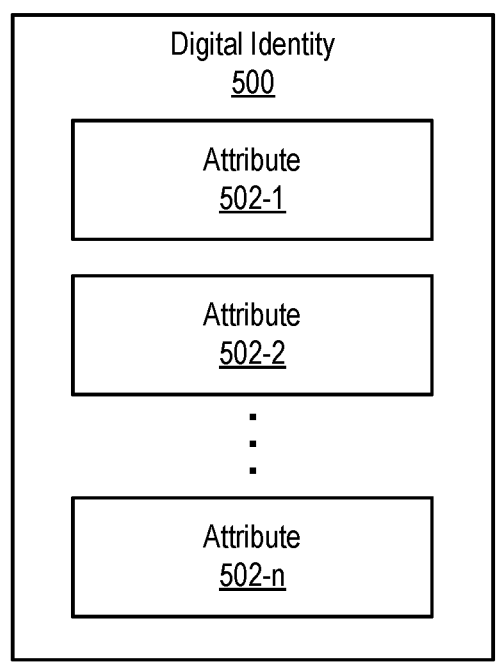
FIG. 5 illustrates an exemplary digital identity associated with a user according to principles described herein.

FIG. 5 illustrates an exemplary digital identity 500 associated with a user and that may be maintained by escrow system 102. As shown, digital identity 500 may include a plurality of attributes 502 (e.g., attributes 502-1 through 502-n). Each attribute is representative of one of the forms of personally identifiable information provided by the user, for example, when the user signs up for a digital identity escrow service provided by escrow system 102. For example, attribute 502-1 may include data representative of credit card information for the user, attribute 502-2 may include data representative of a driver's license of the user, etc. Exemplary information that may be included in digital identity 500 is described in more detail in co-pending U.S. Patent Publication No. 2018/0254907, entitled "Self-Authenticating Digital Identity" and published Sep. 6, 2018, the contents of which are incorporated herein by reference in their entirety.

Digital identity 500 may be maintained by escrow system 102 in any suitable manner. For example, as described herein, escrow system 102 may encrypt digital identity 500 and store encrypted identity data representative of digital identity 500 in storage facility 202. As part of the encryption process, an issuer associated with escrow system 102 may digitally sign digital identity 500 with a timestamp to indicate that digital identity 500 is valid and in fact associated with the user.

Figure 6:
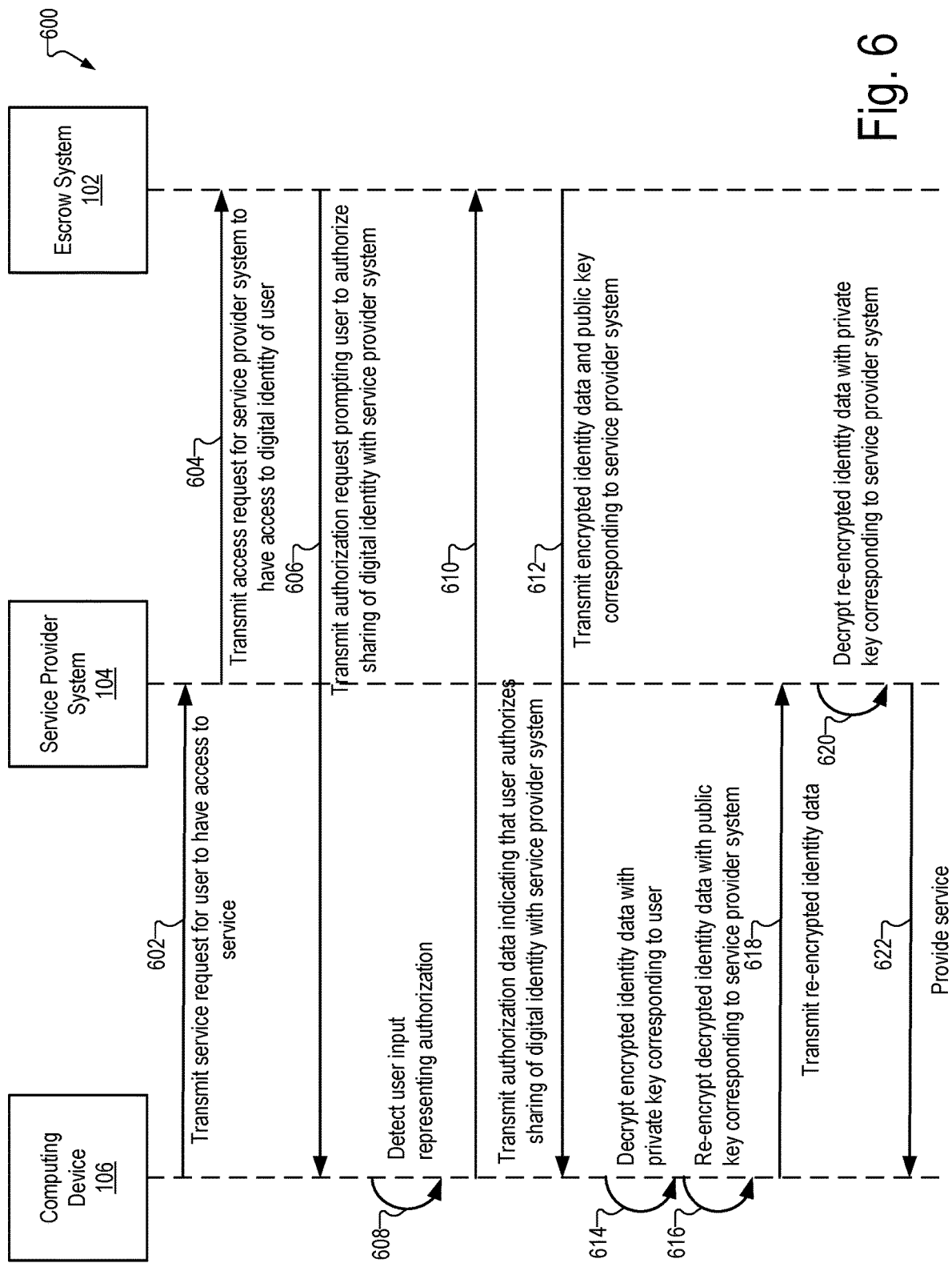
FIGS. 6-8 illustrate various sequence diagrams according to principles described herein.
Figure 7:
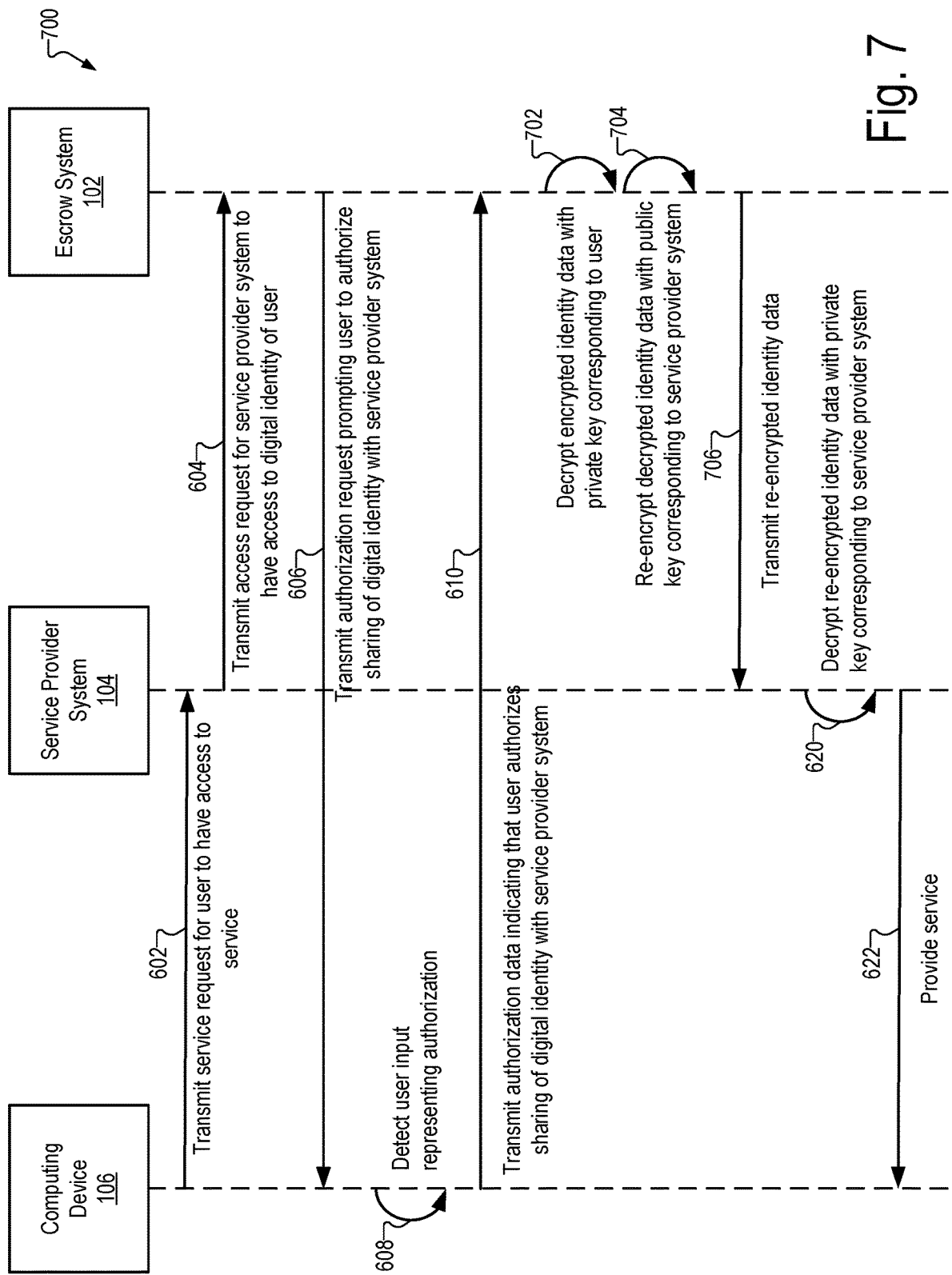
Figure 8:
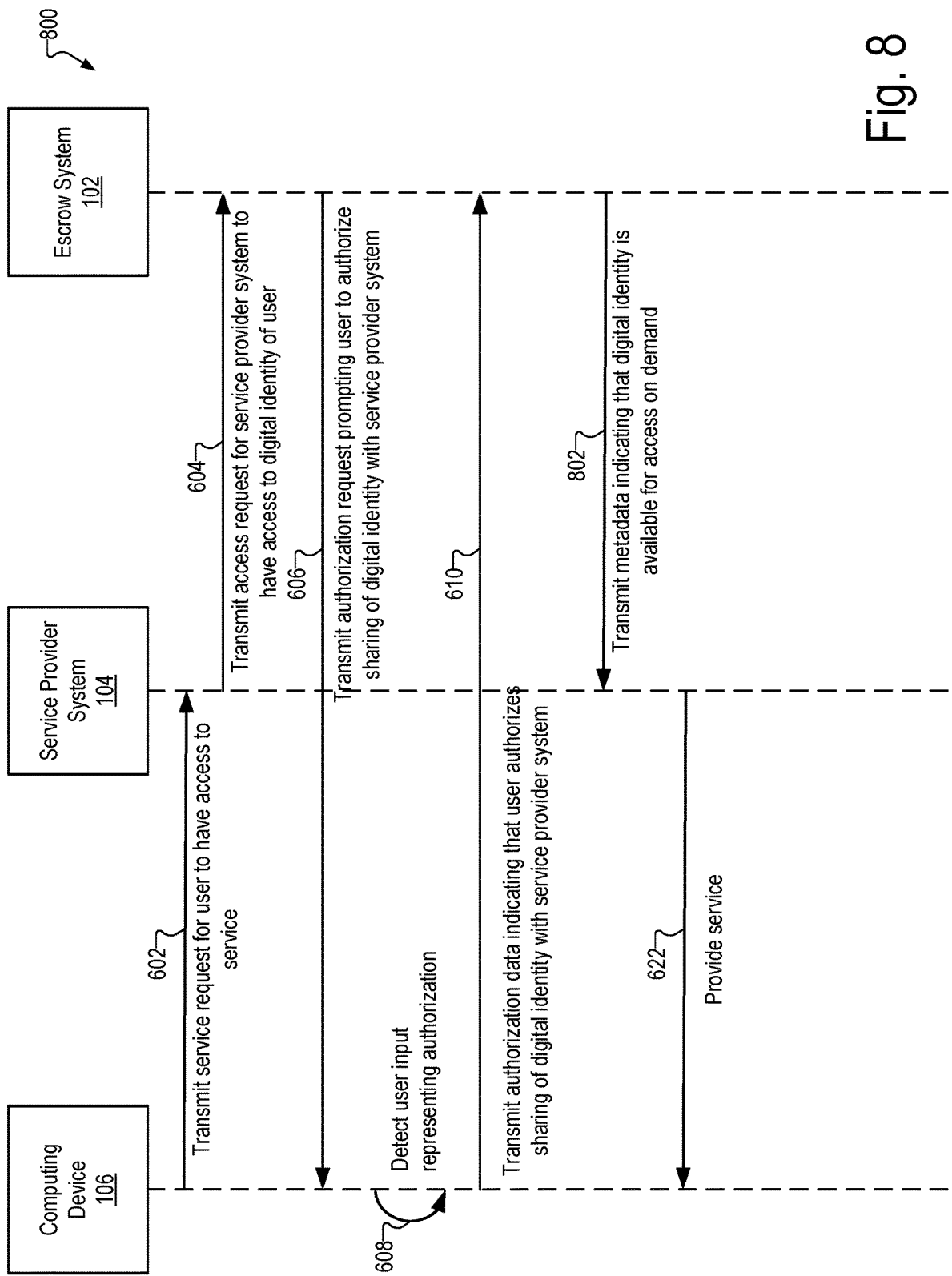

FIGS. 6-8 show exemplary sequence diagrams 600, 700, and 800, respectively, that illustrate operations that may be performed by escrow system 102, service provider system 104, and computing device 106 in accordance with the methods and systems described herein. In particular, each sequence diagram 600, 700, and 800 illustrates a different manner in which escrow system 102 provides service provider system 104 with access to a digital identity (e.g., digital identity 500) of a user. In the examples of FIGS. 6-8, it is assumed that that escrow system 102 maintains encrypted identity data representative of the digital identity of the user. It is also assumed in the examples of FIGS. 6-8 that service provider system 104 requires access to at least one attribute of a user's digital identity before providing the user with access to a service.

In sequence diagram 600, computing device 106 transmits a service request to service provider system 104 (operation 602). The service request requests access by the user to a service provided by service provider system 104. The service request may be provided in any suitable manner. For example, the user may select an option presented within a graphical user interface (e.g., a graphical user interface presented by an application associated with the service) displayed by computing device 106. As part of the service request, the user or computing device 106 may provide service provider system 104 with an identity handle (e.g., a phone number, an email, or other unique identifier associated with the user) and/or other information that uniquely identifies the user.

While FIG. 6 shows that the service request is transmitted from computing device 106 to service provider system 104, it will be recognized that in some alternative embodiments, the service request may be provided by the user interacting directly with service provider system 104. For example, the user may provide the service request by interacting with a computing device included in service provider system 104.

In response to receiving the service request from computing device 106, service provider system 104 transmits an access request to escrow system 102 (operation 604). The access request requests access by service provider system 104 to the digital identity of the user. In some examples, the access request is for the entire digital identity represented by the encrypted identity data maintained by escrow system 102. In alternative examples, the access request is for an attribute subset of the total number of attributes included in the digital identity. For example, service provider system 104 may only need credit card information and a driver's license number for the user, while the digital identity maintained by escrow system 102 for the user includes additional personally identifiable information. Hence, in this example, the access request may include a request for only the credit card information and the driver's license number for the user.

In response to receiving the access request transmitted by service provider system 104, escrow system 102 transmits an authorization request to computing device 106 (operation 606). The authorization request is configured to prompt the user to authorize sharing of the user's digital identity with service provider system 104. Escrow system 102 may transmit the authorization request in any suitable manner. For example, escrow system 102 may transmit a push notification to computing device 106. The push notification may include a link or other selectable option that may be selected by the user to indicate that the user approves of escrow system 102 sharing the user's digital identity with service provider system 104. The user may provide authorization for escrow system 102 to share the user's digital identity with service provider system 104 in any other manner (e.g., using biometric input, third-party verification services, etc.). For example, the user may provide authorization for escrow system 102 to share the user's digital identity with service provider system 104 by entering a username and password by way of a web browser or other suitable interface.

In some alternative examples, escrow system 102 transmits the authorization request to service provider system 104 instead of to computing device 106. In these examples, the user may provide authorization by interacting with service provider system 104. For example, service provider system 104 may include one or more biometric scanning devices configured to receive biometric input from the user in order to verify that the user provides authorization for escrow system 102 to share the user's digital identity with service provider system 104.

Returning to the example where the authorization request is transmitted by escrow system 102 to computing device 106, computing device 106 detects user input representing authorization for escrow system 102 to share the user's digital identity with service provider system 104 (operation 608). Computing device 106 (e.g., an application executed by computing device 106) may detect this user input in any suitable manner. For example, computing device 106 may detect that the user selects an option or link included in a push notification transmitted to computing device 106.

In response to detecting the user input representing authorization, computing device 106 transmits authorization data indicating that the user authorizes escrow system 102 to share the user's digital identity with service provider system 104 (operation 610). The authorization data may be transmitted in any suitable manner.

In response to receiving the authorization data, escrow system 102 provides service provider system 104 with access to the user's digital identity. For purposes of this example, it will be assumed that service provider system 104 is to have access to the entire digital identity (i.e., all of the attributes included in the digital identity). In alternative examples where service provider system 104 only requests access to an attribute subset included in the attributes of the digital identity, escrow system 102 may provide service provider system 104 with access to the attributes subset while abstaining from providing service provider system 104 with access to attributes not included in the attribute subset. This may be performed in any suitable manner.

To provide service provider system 104 with access to the user's digital identity, escrow system 102 transmits the encrypted identity data and a public key corresponding to service provider system 104 to computing device 106 (operation 612). The public key may be implemented in any suitable manner. As will be made apparent herein, encryption of data with a public key corresponding to a particular entity may only be decrypted using a private key corresponding to the particular entity.

In operation 614, computing device 106 decrypts the encrypted identity data using a private key corresponding to the user associated with the encrypted identity data. Computing device 106 may decrypt the encrypted identity data using the private key in any suitable manner.

In operation 616, computing device 106 re-encrypts the decrypted identity data with the public key corresponding to service provider system 104 (i.e., the public key transmitted in operation 612). This may be performed in any suitable manner.

In operation 618, computing device 106 transmits the re-encrypted identity data to service provider system 104. In operation 620, service provider system 104 decrypts the re-encrypted identity data with a private key corresponding to service provider system 104. In this manner, service provider system 104 may access the digital identity of the user.

Once service provider system 104 has accessed the digital identity of the user, service provider system 104 may perform various operations with respect to the digital identity. For example, service provider system 104 may permanently delete the digital identity from its storage facility 302. In this example, if service provider system 104 has need to again access the digital identity of the user, service provider system 104 may obtain the digital identity directly from escrow system 102. Alternatively, service provider system 104 may re-encrypt the digital identity and store the encrypted digital identity within storage facility 302 and/or in any other data store for future access as needed.

Once service provider system 104 has access to the digital identity of the user, service provider system 104 may provide the requested service to the user. In the example of FIG. 6, this is performed by transmitting data associated with the service to computing device 106 (operation 622). The service may be otherwise provided as may serve a particular implementation.

Sequence diagram 700 of FIG. 7 shows an alternative manner in which escrow system 102 may provide service provider system 104 with a user's digital identity. In sequence diagram 700, operations 602-610 are the same as those described in connection with sequence diagram 600. However, in sequence diagram 700, in response to receiving authorization data indicating that the user authorizes escrow system 102 to share the user's digital identity with service provider system 104, escrow system 102 decrypts the encrypted identity data with a private key corresponding to the user (operation 702). Escrow system 102 then re-encrypts the decrypted identity data with a public key corresponding to service provider system 104 (operation 704). Escrow system 102 then transmits the re-encrypted identity data directly to service provider system 104 (operation 706). Service provider system 104 may decrypt the re-encrypted identity data and provide the requested service to computing device 106 as described above in connection with operations 620 and 622 of sequence diagram 600.

Hence, sequence diagram 700 differs from sequence diagram 600 in that the decryption and re-encryption of the identity data is performed by escrow system 102 instead of computing device 106. This may be beneficial in various configurations in which it may be desirable to minimize the operations performed by computing device 106.

Sequence diagram 800 of FIG. 8 shows an alternative manner in which escrow system 102 may provide service provider system 104 with a user's digital identity. In sequence diagram 800, operations 602-610 are the same as those described in connection with sequence diagram 600. However, in sequence diagram 800, in response to receiving authorization data indicating that the user authorizes escrow system 102 to share the user's digital identity with service provider system 104, escrow system 102 transmits metadata indicating that the user's digital identity is available to service provider system 104 for access on-demand (operation 802). In some examples, the metadata includes a selectable link, a token, a ticket, or any other suitable data that may be selected and/or used to facilitate future access by an operator of service provider system 104.

In sequence diagram 800, escrow system 102 at least initially abstains from providing data representative of the actual digital identity of the user to service provider system 104. Service provider system 104 may be assured in accordance with the metadata that the user has a valid digital identity and that service provider system 104 may access actual contents of the digital identity if needed. Service provider system 104 may accordingly provide the service to the user (operation 622) without actually receiving the user's digital identity. This may be beneficial in some scenarios in which service provider system 104 does not desire to actually handle the user's digital identity unless a need arises (e.g., if the user causes damage to property associated with service provider system 104 and service provider system 104 needs to access credit card information for the user in order to charge the user for the damage).

In some examples, if service provider system 104 determines that access to the digital identity is actually needed, service provider system 104 may transmit a request to escrow system 102 for escrow system 102 to transmit data representative of the digital identity to service provider system 104. In response to this request, escrow system 102 may perform operations 702-706 of sequence diagram 700 to provide the requested data to service provider system 104.

In the examples described above, identity data is encrypted and decrypted using public and private keys. It will be recognized, however, that any other suitable cryptographic process may be used to encrypt and decrypt identity data. For example, in some alternative examples, a split key maintained by multiple entities may be required for service provider system 104 to decrypt encrypted identity data transmitted thereto by escrow system 102 or computing device 106. For example, a split key maintained by service provider system 104 and escrow system 102 may be required to decrypt encrypted identity data transmitted to service provider system 104.

As also mentioned above, in some examples, metadata may be transmitted from escrow system 102 to service provider system 104. For example, as described in connection with FIG. 8, metadata may be transmitted from escrow system 102 to service provider system 104 in place of encrypted identity data. However, in some examples, metadata may be transmitted from escrow system 102 to service provider system 104 together with encrypted identity data. In these examples, the metadata may include information associated with the digital identity represented by the encrypted identity data.

To illustrate, the metadata may include information representative of a description of one or more attributes of the digital identity represented by the encrypted identity data. For example, the metadata may indicate that values for a particular set of attributes are included in the digital identity represented by the encrypted identity data. In this manner, service provider system 104 may determine that the encrypted identity data includes certain types of information without needing to decrypt the encrypted identity data.

Additionally or alternatively, the metadata may include a digital signature indicating that the digital identity represented by the encrypted identity data has been verified by a validator. In this manner, and operator of service provider system 104 may be assured that the digital identity is valid.

Additionally or alternatively, the metadata may include one or more access control rules that specify one or more access parameters associated with the digital identity. For example, the one or more access control rules may specify various terms and conditions associated with accessing the digital identity. As another example, the one or more access control rules may specify an authorization expiration time for access to the digital identity. Upon completion of the authorization expiration time, service provider system 104 may be prevented from accessing the digital identity. This may be performed in any suitable manner.

Figure 9:
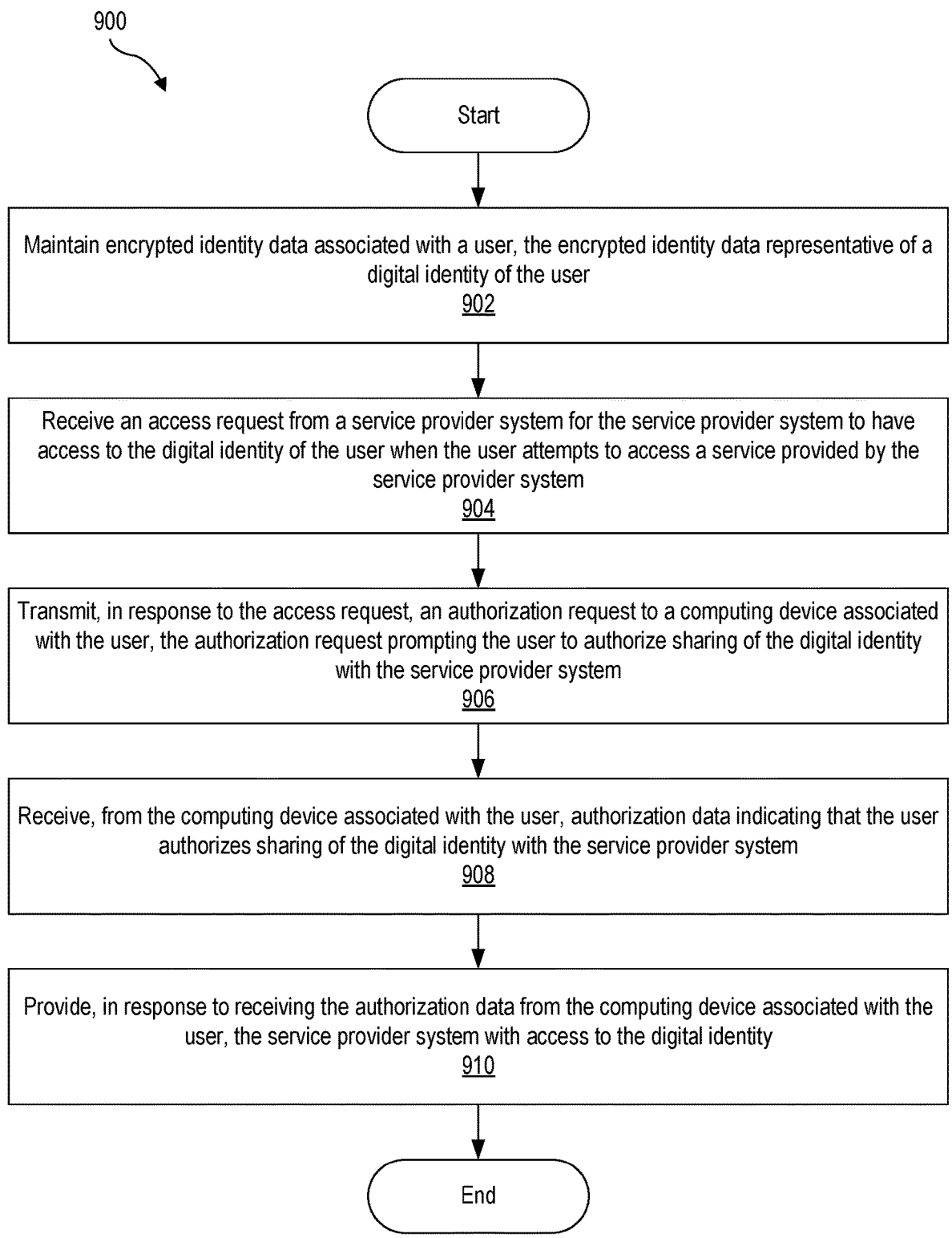
FIGS. 9-11 illustrate various methods according to principles described herein.

FIG. 9 illustrates an exemplary method 900. While FIG. 9 illustrates exemplary operations according to one embodiment, other embodiments may omit, add to, reorder, and/or modify any of the operations shown in FIG. 9. The operations shown in FIG. 9 may be performed by escrow system 102, any components included therein, and/or any implementation thereof.

In operation 902, an escrow system maintains encrypted identity data associated with a user. The encrypted identity data is representative of a digital identity of the user. Operation 902 may be performed in any of the ways described herein.

In operation 904, the escrow system receives an access request from a service provider system for the service provider system to have access to the digital identity of the user when the user attempts to access a service provided by the service provider system. Operation 904 may be performed in any of the ways described herein.

In operation 906, the escrow system transmits, in response to the access request, an authorization request to a computing device associated with the user. The authorization request prompts the user to authorize sharing of the digital identity with the service provider system. Operation 906 may be performed in any of the ways described herein.

In operation 908, the escrow system receives, from the computing device associated with the user, authorization data indicating that the user authorizes sharing of the digital identity with the service provider system. Operation 908 may be performed in any of the ways described herein.

In operation 910, the escrow system provides, in response to receiving the authorization data from the computing device associated with the user, the service provider system with access to the digital identity. Operation 910 may be performed in any of the ways described herein.

Figure 10:
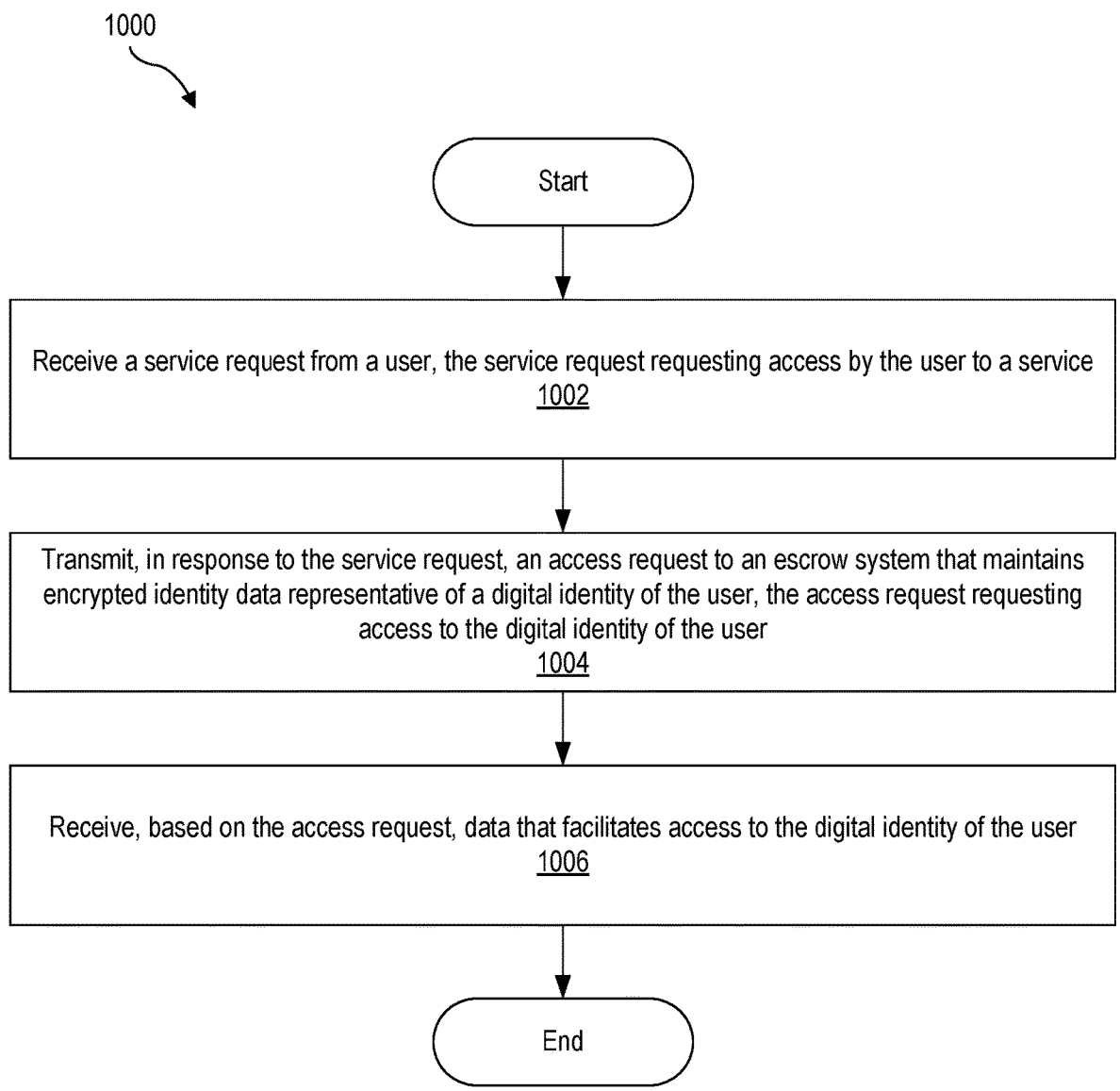

FIG. 10 illustrates an exemplary method 1000. While FIG. 10 illustrates exemplary operations according to one embodiment, other embodiments may omit, add to, reorder, and/or modify any of the operations shown in FIG. 10. The operations shown in FIG. 10 may be performed by service provider system 102, any components included therein, and/or any implementation thereof.

In operation 1002, a service provider system receives a service request from a user. The service request requests access by the user to a service provided by the service provider system. Operation 1002 may be performed in any of the ways described herein.

In operation 1004, the service provider system transmits, in response to the service request, an access request to an escrow system that maintains encrypted identity data representative of a digital identity of the user. The access request requests access to the digital identity of the user. Operation 1004 may be performed in any of the ways described herein.

In operation 1006, the service provider system receives, based on the access request, data that facilitates access to the digital identity of the user. Operation 1006 may be performed in any of the ways described herein.

Figure 11:
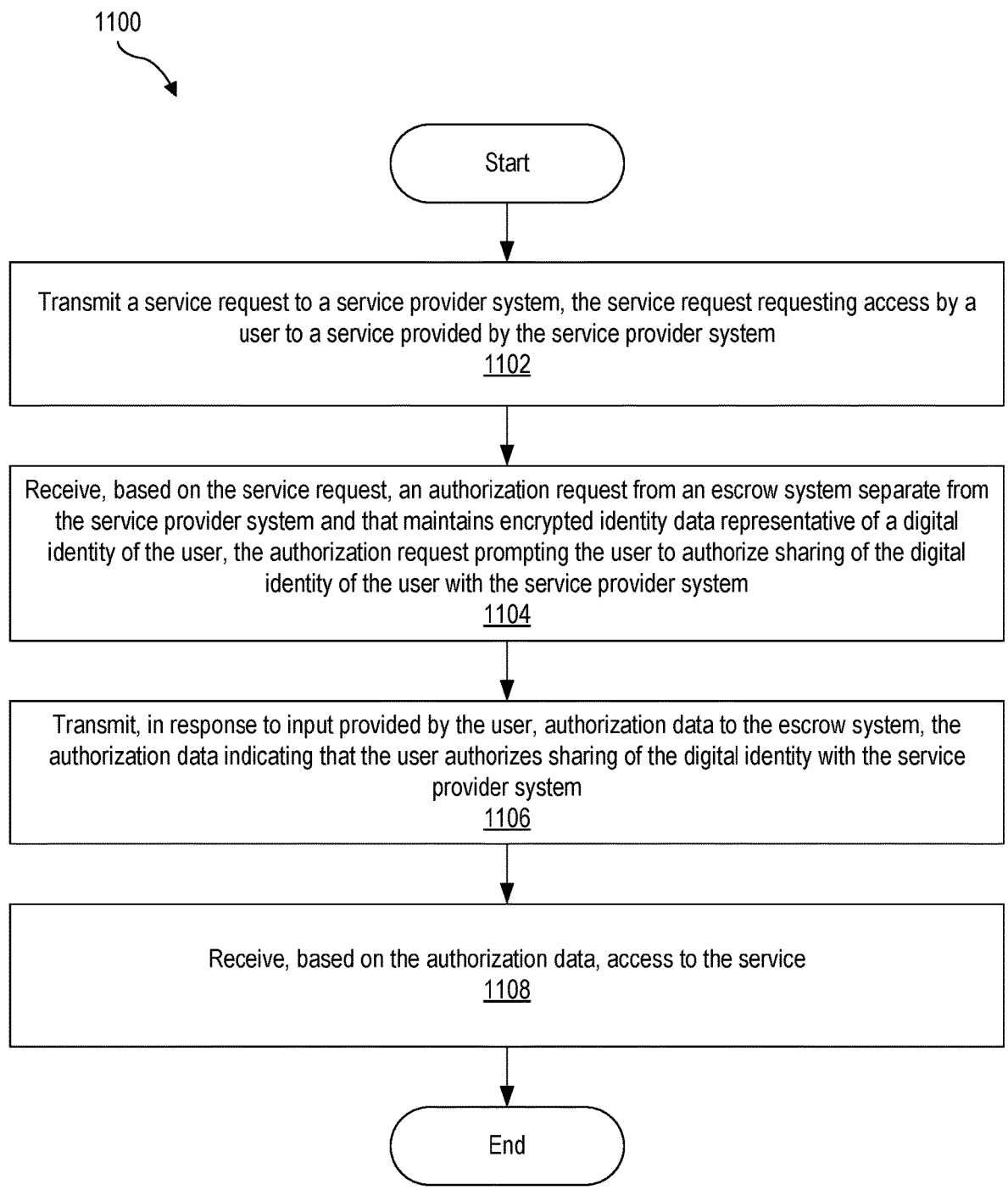

FIG. 11 illustrates an exemplary method 1100. While FIG. 11 illustrates exemplary operations according to one embodiment, other embodiments may omit, add to, reorder, and/or modify any of the operations shown in FIG. 11. The operations shown in FIG. 11 may be performed by computing device 106, an application executed by computing device 106, any components included in computing device 106, and/or any implementation of computing device 106.

In operation 1102, an application executed by a computing device transmits a service request to a service provider system. The service request requests access by a user to a service provided by the service provider system. Operation 1102 may be performed in any of the ways described herein.

In operation 1104, the application executed by the computing device receives, based on the service request, an authorization request from an escrow system separate from the service provider system and that maintains encrypted identity data representative of a digital identity of the user. The authorization request prompts the user to authorize sharing of the digital identity of the user with the service provider system. Operation 1104 may be performed in any of the ways described herein.

In operation 1106, the application executed by the computing device transmits, in response to input provided by the user, authorization data to the escrow system. The authorization data indicates that the user authorizes sharing of the digital identity with the service provider system. Operation 1106 may be performed in any of the ways described herein.

In operation 1108, the application executed by the computing device receives, based on the authorization data, access to the service. Operation 1108 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 12:
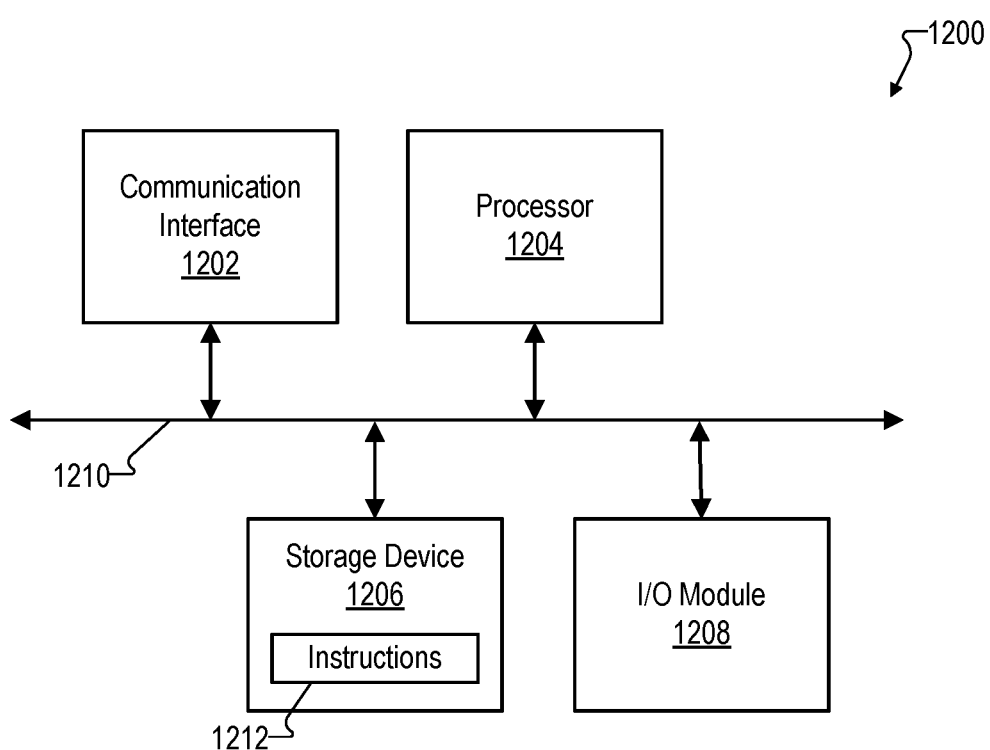
FIG. 12 illustrates an exemplary computing device according to principles described herein.

FIG. 12 illustrates an exemplary computing device 1200 that may be specifically configured to perform one or more of the processes described herein. Any of the systems, units, computing devices, and/or other components described herein may be implemented by computing device 1200.

As shown in FIG. 12, computing device 1200 may include a communication interface 1202, a processor 1204, a storage device 1206, and an input/output ("I/O") module 1208 communicatively connected one to another via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data and/or interpreting, executing, and/or directing execution of one or more of the instructions, processes, and/or operations described herein. Processor 1204 may perform operations by executing computer-executable instructions 1212 (e.g., an application, software, code, and/or other executable data instance) stored in storage device 1206.

Storage device 1206 may include one or more data storage media, devices, or configurations and may employ any type, form, and combination of data storage media and/or device. For example, storage device 1206 may include, but is not limited to, any combination of the non-volatile media and/or volatile media described herein. Electronic data, including data described herein, may be temporarily and/or permanently stored in storage device 1206. For example, data representative of computer-executable instructions 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

To the extent the aforementioned embodiments collect, store, and/or employ personal information provided by individuals, it should be understood that such information may be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by an escrow system, encrypted identity data associated with a user, the encrypted identity data representative of a digital identity of the user;
   receiving, by the escrow system, an access request from a service provider system for the service provider system to have access to the digital identity of the user when the user attempts to access a service provided by the service provider system;
   transmitting, by the escrow system in response to the access request, an authorization request to a computing device associated with the user, the authorization request prompting the user to authorize sharing of the digital identity with the service provider system, the transmitting of the authorization request comprising transmitting a push notification to the computing device;
   receiving, by the escrow system from the computing device associated with the user, authorization data indicating that the user authorizes sharing of the digital identity with the service provider system; and
   providing, by the escrow system in response to receiving the authorization data from the computing device associated with the user, the service provider system with access to the digital identity.

2. The method of claim 1, wherein the providing of the service provider system with access to the digital identity comprises transmitting the encrypted identity data and a public key corresponding to the service provider system to the computing device, wherein the computing device is configured to
   decrypt the encrypted identity data with a private key corresponding to the user,
   re-encrypt the decrypted identity data with the public key corresponding to the service provider system, and
   transmit the re-encrypted identity data to the service provider system.

3. The method of claim 1, wherein the providing of the service provider system with access to the digital identity comprises:
   decrypting the encrypted identity data;

re-encrypting the decrypted identity data with a public key corresponding to the service provider system; and transmitting the re-encrypted identity data to the service provider system.

4. The method of claim 3, wherein a split key maintained by the service provider system and a third-party entity is required to decrypt the re-encrypted identity data.

5. The method of claim 1, wherein the providing of the service provider system with access to the digital identity comprises transmitting, to the service provider system, metadata indicating that the digital identity is available for access on demand by the service provider system.

6. The method of claim 5, wherein the metadata includes data configured to facilitate future access to the digital identity by an operator of the service provider system.

7. The method of claim 5, further comprising:

receiving, by the escrow system from the service provider system subsequent to the transmitting of the metadata to the service provider system, a request for the escrow system to transmit data representative of the digital identity to the service provider system;

decrypting, by the escrow system in response to the request for the service provider system to transmit the data representative of the digital identity to the service provider system, the encrypted identity data;

re-encrypting, by the escrow system, the decrypted identity data with a public key corresponding to the service provider system; and transmitting, by the escrow system, the re-encrypted identity data to the service provider system.

8. The method of claim 1, further comprising:

transmitting, by the escrow system in response to receiving the authorization data from the computing device associated with the user, metadata associated with the encrypted identity data;

wherein the metadata includes information representative of at least one of
- a description of one or more attributes of the digital identity represented by the encrypted identity data,
- a digital signature indicating that the digital identity represented by the encrypted identity data has been verified by a validator, and
- an access control rule that specifies one or more access parameters associated with the digital identity.

9. The method of claim 1, wherein:

the digital identity represented by the encrypted identity data comprises a plurality of attributes;

the access request comprises a request to have access to an attribute subset included in the plurality of attributes, a total number of attributes included in the attribute set subset being less than a total number of attributes included in the plurality of attributes; and the providing of the service provider with access to the digital identity comprises
providing the service provider system with access to the attribute subset; and abstaining from providing the service provider system with access to attributes included in the plurality of attributes but not included in the attribute subset.

10. The method of claim 1, embodied as computer-executable instructions on at least one non-transitory computer-readable medium.

11. A method comprising:

receiving, by a service provider system, a service request from a user, the service request requesting access by the user to a service provided by the service provider system;

transmitting, by the service provider system in response to the service request, an access request to an escrow system that maintains encrypted identity data representative of a digital identity of the user, the access request requesting access by the service provider system to the digital identity of the user; and receiving, by the service provider system based on the access request, a version of the identity data that has been decrypted and then re-encrypted with a public key corresponding to the service provider system; and decrypting, by the service provider system, the re-encrypted identity data using a private key corresponding to the service provider system.

12. The method of claim 11, wherein:

the decrypting and re-encrypting of the identity data is performed by the escrow system; and the receiving of the re-encrypted identity data comprises receiving the re-encrypted identity data from the escrow system by way of a network.

13. The method of claim 11, wherein:

the decrypting and re-encrypting of the identity data is performed by a computing device associated with the user; and the receiving of the re-encrypted identity data comprises receiving the re-encrypted identity data from the computing device by way of a network.

14. The method of claim 11, embodied as computer-executable instructions on at least one non-transitory computer-readable medium.

15. A method comprising:

transmitting, by an application executed by a computing device associated with a user, a service request to a service provider system; the service request requesting access by the user to a service provided by the service provider system;

receiving, by the application executed by the computing device and based on the service request, an authorization request from an escrow system separate from the service provider system and that maintains encrypted identity data representative of a digital identity of the user, the authorization request prompting the user to authorize sharing of the digital identity of the user with the service provider system;

transmitting, by the application executed by the computing device and in response to input provided by the user, authorization data to the escrow system; the authorization data indicating that the user authorizes sharing of the digital identity with the service provider system;

receiving, by the application executed by the computing device from the escrow system, the encrypted identity data and a public key corresponding to the service provider system;

decrypting, by the application executed by the computing device, the encrypted identity data with a private key corresponding to the user;

re-encrypting, by the application executed by the computing device, the decrypted identity date with the public key corresponding to the service provider system; and transmitting, by the application executed by the computing device, the re-encrypted identity data to the service provider system.

16. The method of claim 15, embodied as computer-executable instructions on at least one non-transitory computer-readable medium.

17. A system comprising:
a memory storing instructions;

a processor communicatively coupled to the memory and configured to execute the instructions to;

maintain encrypted identity data associated with a user, the encrypted identity data representative of a digital identity of the user;

receive an access request from a service provider system for the service provider system to have access to the digital identity of the user when the user attempts to access a service provided by the service provider system;

transmit, in response to the access request, an authorization request to a computing device associated with the user, the authorization request prompting the user to authorize sharing of the digital identity with the service provider system, the transmitting of the authorization request comprising transmitting a push notification to the computing device;

receive, from the computing device associated with the user, authorization data indicating that the user authorizes sharing of the digital identity with the service provider system; and provide, in response to receiving the authorization data from the computing device associated with the user, the service provider system with access to the digital identity.

18. The system of claim 17, wherein the providing of the service provider system with access to the digital identity comprises transmitting the encrypted identity data and a public key corresponding to the service provider system to the computing device.

19. The system of claim 17, wherein the providing of the service provider system with access to the digital identity comprises:

decrypting the encrypted identity data;

re-encrypting the decrypted identity data with a public key corresponding to the service provider system; and transmitting the re-encrypted identity data to the service provider system.

20. The system of claim 17, wherein the providing of the service provider system with access to the digital identity comprises transmitting, to the service provider system, metadata indicating that the digital identity is available for access on demand by the service provider system.

\* \* \* \* \*